United States Patent [19]

Hall et al.

[11] Patent Number: 4,826,267

[45] Date of Patent: May 2, 1989

[54] SPECTRAL FILTER WITH INTEGRAL ANTIREFLECTION COATING

[75] Inventors: Randolph L. Hall, Newbury Park; Frank J. Woodberry, Malibu; William H. Southwell, Thousand Oaks, all of Calif.

[73] Assignee: Rockwell International Corporation, El Segundo, Calif.

[21] Appl. No.: 126,809

[22] Filed: Nov. 30, 1987

[51] Int. Cl.⁴ ............................ G02B 1/10; G02B 5/28
[52] U.S. Cl. ...................................... 350/1.6; 350/164; 350/166
[58] Field of Search .......................... 350/1.6, 164–166

[56] References Cited

U.S. PATENT DOCUMENTS

| | | | |
|---|---|---|---|
| 2,281,474 | 4/1942 | Cartwright et al. | 350/164 |
| 2,338,234 | 1/1944 | Dimmick | 427/10 |
| 2,376,428 | 5/1945 | Hansell | 350/164 |
| 2,397,929 | 4/1946 | Dimmick | 350/164 |
| 3,271,179 | 9/1966 | Smith | 350/166 X |
| 3,781,090 | 12/1973 | Sumita | 350/164 |
| 4,229,066 | 10/1980 | Rancourt et al. | 350/1.6 |
| 4,293,732 | 10/1981 | Rancourt et al. | 136/257 |
| 4,583,822 | 4/1986 | Southwell | 350/164 |
| 4,666,250 | 5/1987 | Southwell | 350/166 |
| 4,707,611 | 11/1987 | Southwell | 250/560 |

OTHER PUBLICATIONS

Berning, "Use of Equivalent Films in the Design of Infrared Multilayer Antireflection Coatings," *J.O.S.A.*, vol. 52, p. 431, 1962.

Epstein, "The Design of Optical Filters," *J.O.S.A.*, vol. 42, p. 806, 1952.

Minot, "Single-Layer, Graded Refractive Index Antireflection Films Effective from 0.35 to 2.5μ," *J.O.S.A.*, vol. 66, p. 515, 1976.

Southwell, "Coating Design Using Very Thin High- and Low-Index Layers," *Applied Optics*, vol. 24, p. 457, 1985.

Southwell, "Gradient-Index Anti-reflection Coatings," *Optics Letters*, vol. 8, p. 584, Nov. 1983.

Yadava et al, "Optical Behavior of Gradient-Index Multilayer Films," *Thin Solid Films*, vol. 21, p. 297, 1974.

Primary Examiner—John K. Corbin
Assistant Examiner—David J. Edmondson
Attorney, Agent, or Firm—H. Fredrick Hamann; Craig O. Malin; John J. Deinken

[57] ABSTRACT

A gradient index filter can be fabricated with integral antireflection properties without degrading the inband performance of the filter. The filter is for placement between an incident medium and a substrate to reflect incident electromagnetic energy having wavelengths within a predetermined band of wavelengths and to transmit incident electromagnetic energy having wavelengths outside of the reflection band. The filter includes an antireflecting portion having a nominal refractive index profile selected to reflect a minimum amount of electromagnetic energy from a theoretical interface between a first medium having a first predetermined refractive index and a second medium having a second predetermined refractive index. A band rejecting portion has a periodic refractive index profile whose periodicity and amplitude are selected to reflect a maximum amount of electromagnetic energy within the relfection band. At least part of the nominal refractive index profile is modulated by the superposition thereon of at least part of the periodic refractive index profile. The entire periodic refractive index profile maybe superimposed on the monial refractive index profile, while the periodic refractive index profile may be a rugate profile. In addition, the nominal incident and substrate refractive index profiles may be quintic refractive index profiles.

22 Claims, 14 Drawing Sheets

SPECTRAL FILTER WITH INTEGRAL ANTIREFLECTION COATING

BACKGROUND OF THE INVENTION

This invention relates to the design of optical coatings for controlling the manner in which light of particular wavelengths is transmitted by or reflected from an optical surface.

The phenomenon of optical interference, which causes modifications in the transmitted and reflected intensities of light, occurs when two or more beams of light are combined. The principle of superposition states that the resultant amplitude is the complex sum of the amplitudes of the individual beams. The brilliant colors, for example, which may be seen when light is reflected from a soap bubble or from a thin layer of oil floating on water are produced by interference effects between two trains of light waves, which are created by reflection from the upper and lower surfaces of the thin film of soap solution or oil.

One important practical application for these interference effects in thin films involves the production of coated optical surfaces. If a film of a transparent substance is deposited on glass, for example, with a refractive index which is properly specified relative to the refractive index of the glass and with a thickness which is one quarter of a particular wavelength of light in the film, the reflection of that wavelength of light from the glass surface can be almost completely suppressed. The light which would otherwise be reflected is not absorbed by a nonreflecting film; rather, the energy in the incident light is redistributed so that a decrease in reflection is accompanied by a concomitant increase in the intensity of the light which is transmitted.

Considerable improvements have been achieved in the antireflective performance of such films by using a composite film having two or more superimposed layers. In theory, it is possible with this approach to design a wide range of multiple-layer interference coatings for obtaining a great variety of transmission and reflection spectrums. This has led to the development of many new optical devices which incorporate complex spectral filter structures. Antireflection coatings, laser dielectric mirrors, television camera edge filters, bandpass filters, and stopband filters are some of the useful devices employing such thin-film interference coatings.

Frequently two different materials are used in fabricating such a composite film, one with a relatively high index of refraction and a second material with a relatively low index of refraction. In the digital approach (see, e.g., Southwell, U.S. Pat. No. 4,666,250), the two materials are alternately deposited to specified thicknesses to obtain the desired optical characteristics for the film. Some advanced applications of optical technology, however, require antireflective films which adhere more closely to theoretically specified refractive index profiles. These advanced applications can be achieved through the use of discrete layers having intermediate values of refractive index, which requires the coevaporation of two materials, or the use of a gradient index coating, in which the index of refraction within the coating varies continuously as a function of depth.

Where an application requires an optical coating which controls the spectral qualities of the transmitted and reflected light, such as allowing only wavelengths within a specified band of wavelengths to pass through the coating, it is generally desirable to apply an antireflecting coating to the filter, because the antireflecting coating can improve the performance of the filter over a broad spectral range. U.S. Pat. No. 4,583,822 to Southwell, for example, discloses one such antireflective design for a thin film optical coating. Unfortunately, however, such an antireflecting coating also may degrade the performance of the spectral filter within a narrow wavelength range of interest. Thus it would be desirable to provide the desirable antireflecting features of an antireflecting coating in a thin film spectral filter design while avoiding the concomitant degradation in performance which has accompanied the addition of antireflecting layers in the prior art.

SUMMARY OF THE INVENTION

This invention enables an optical thin film designer to fabricate a gradient index filter with integral antireflection properties without degrading the inband performance of the filter.

A gradient index spectral filter constructed according to this invention for placement between an incident medium and a substrate reflects incident electromagnetic energy having wavelengths within a predetermined band of wavelengths and transmits incident electromagnetic energy having wavelengths outside of the reflection band. The filter includes an antireflecting portion having a nominal refractice index profile selected to reflect a minimum amount of electromagnetic energy from a theoretical interface between a first medium having a first predetermined refractive index and a second medium having a second predetermined refractive index. A band rejecting portion has a periodic refractive index profile whose periodicity and amplitude are selected to reflect a maximum amount of electromagnetic energy within the reflection band. At least part of the nominal refractive index profile is modulated by the superposition thereon of at least part of the periodic refractive index profile.

In more detailed embodiments, the entire periodic refractive index profile is superimposed on the nominal refractive index profile, while the periodic refractive index profile may be a rugate profile. Moreover, the reflection band may be a first reflection band and the band rejecting portion a first band rejecting portion having a first periodic refractive index profile whose periodicity and amplitude are selected to reflect a maximum amount of electromagnetic energy within the first reflection band, with a second band rejecting portion having a second periodic refractive index profile whose periodicity and amplitude are selected to reflect a maximum amount of electromagnetic energy within a second reflection band, at least part of the nominal refractive index profile being modulated by the superposition thereon of at least part of the second periodic refractive index profile. In addition, the nominal incident and substrate refractive index profiles may be quintic refractive index profiles.

A method of designing a gradient index spectral filter for placement between an incident medium and a substrate to reflect incident electromagnetic energy having wavelengths within a predetermined band of wavelengths and to transmit incident electromagnetic energy having wavelengths outside of the reflection band includes the steps of selecting a periodicity and amplitude for a periodic refractive index profile which will reflect a maximum amount of electromagnetic energy within the reflection band; selecting an antireflecting portion with a nominal refractive index profile which will reflect a minimum amount of electromagnetic energy from a theoretical interface between a first medium having a first predetermined refractive index and a second medium having a second predetermined refractive index; and superimposing at least part of the periodic refractive index profile on at least part of the nominal refractive index profile to define a refractive index profile for an interference filter with integral antireflection.

In a more particular embodiment, the filter includes an incident antireflecting portion disposed adjacent to the incident medium and having a nominal refractive index profile selected to reflect a minimum amount of electromagnetic energy from a theoretical interface between the incident medium and a medium having a predetermined refractive index. A substrate antireflecting portion is disposed between the substrate and the incident portion and has a nominal refractive index profile selected to reflect a minimum amount of electromagnetic energy from a theoretical interface between a medium having the predetermined refractive index and the substrate. The nominal incident substrate refractive index profiles are modulated by a superimposed periodic refractive index profile whose periodicity and amplitude are selected to reflect a maximum amount of electromagnetic energy within the reflection band.

DESCRIPTION OF THE INVENTION

Figure 1:
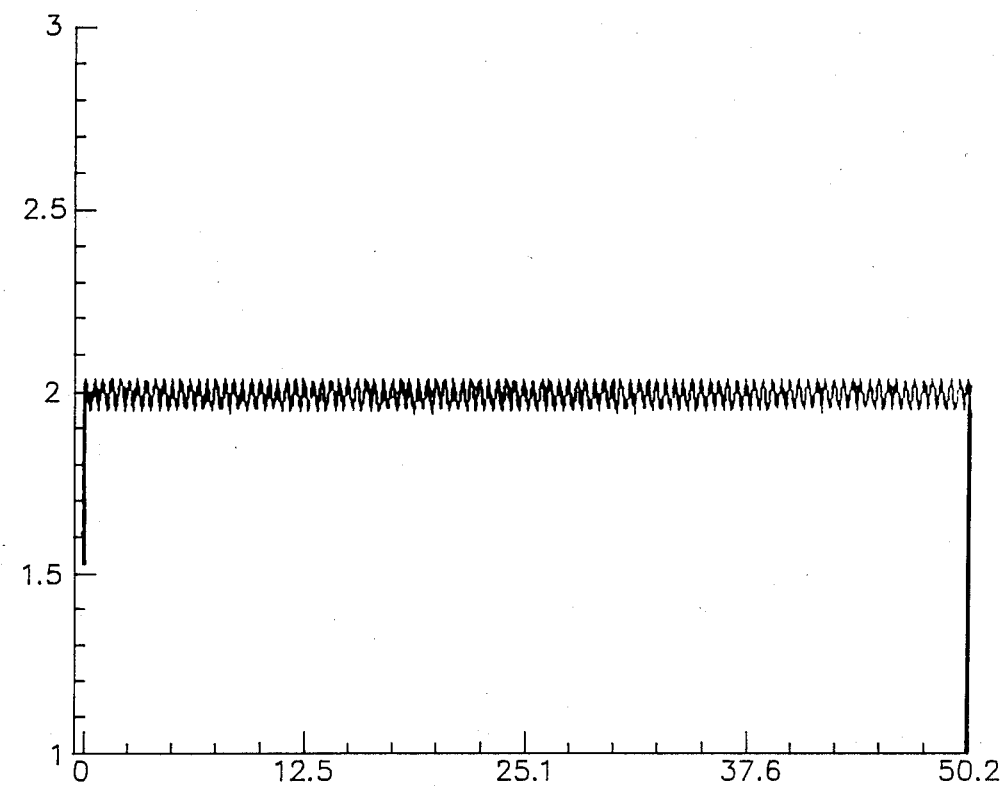
FIG. 1 is a plot of the refractive index profile for an enhanced rugate filter, with the refractive index of the filter plotted on the vertical axis and the depth or thickness of the filter plotted on the horizontal axis in microns.

This invention provides a new periodic, gradient index filter design which incorporates antireflection in the filter while maintaining the inband performance of the filter. An antireflection coating using quarterwave matching layers is effective in suppressing the side lobes of a periodic index filter only near the wavelengths for which the matching layers are quarterwave. More complex matching layers, such as quintic profile layers, are capable of supressing side lobes over wide wavelength regions, but diminish the performance of the filter. In an outstanding feature of this invention, it has been discovered that the loss in inband optical density which results when index matching antireflecting layers are added to a peiodic index filter can be substantially restored by superimposing the periodic index profile on the profile for the index matching regions of the filter. If the matching regions are sufficiently thick, the entire periodic filter structure can be integrated with the antireflecting structure. Such an integrated filter demonstrates excellent broadband side lobe suppression with minimum degradation of the desired narrowband performance.

The gradient index spectral filter of this invention is designed to be placed between an incident medium and a substrate to reflect incident electromagnetic energy having wavelengths within a predetermined band of wavelengths and to transmit incident electromagnetic energy having wavelengths outside of the reflection band. Generally, the inventive filter includes an antireflecting portion having a nominal refractive index profile selected to reflect a minimum amount of electromagnetic energy from a theoretical interface between a first medium having a first predetermined refractive index and a second medium having a second predetermined refractive index. The band rejecting portion of the filter has a periodic refractive index profile whose periodicity and amplitude are selected to reflect a maximum amount of electromagnetic energy within the reflection band. At least part of the nominal refractive index profile is modulated by the superposition thereon of at least part of the periodic refractive index profile.

In general an optical coating having a gradient-index distribution is characterized by a continuously varying index of refraction. The rugate filter, for example, is a particular type of gradient-index filter in which the variation in refractive index follows a sinusoidal pattern. Ultrathin-film and rugate optical coatings are typically fabricated by placing a substrate and one or more source materials in a vacuum chamber. The source materials are heated to increase their vapor pressure and the vacuum chamber pressure is sufficiently reduced that the molecular mean free path is greater than the source-to-target distance, allowing the source materials to deposit on the target surface. Typically, either source can be selectively blocked from access to the target in order to vary the refractive index of the depositing material. The heating of the source material, the choice of the source material, and the duration of the vapor deposition are frequency controlled automatically. Through the use of an ellipsometer (see, e.g., U.S. patent application Ser. No. 884,689, filed July 11, 1986), the present state of the art permits the deposition of ultrathin layers on the order of 100 Angstroms whose thickness can be measured to within a few Angstrom units (1 Angstrom = $10^{-8}$ centimeter). These ellipsometer measurements typically take only a few seconds, allowing the entire film deposition process to be continuously controlled by a computer.

Assuming that the two source materials mix cleanly without chemically combining to form new compounds, and further assuming that the optical refractive index of the mixed materials is the same as if they were being paired as thin layers, the two materials can be evaporated together in different porportions to form layers with an arbitrary refractive index where, for example, a layer having a refractive index different from any available material is required, or where the refractive index must be continuously varied so that a gradient index coating can be deposited.

The feature of this invention may be further appreciated by comparing a number of different approaches to designing a stopband filter which is specified to reflect wavelengths at 2.0 microns and transmit all other wavelengths. The filters in this series are further required to operate between an incident medium of air and a glass substrate having a refractive index of 1.52, while two optical materials with a difference in refractive index of 0.1 are to be used in fabricating the filters. This series of different filter configurations was developed and evaluated for performance by computer simulation techniques in order to demonstrate the advantages of this invention in providing improved antireflecting properties while maintaining desired performance levels.

Figure 2:
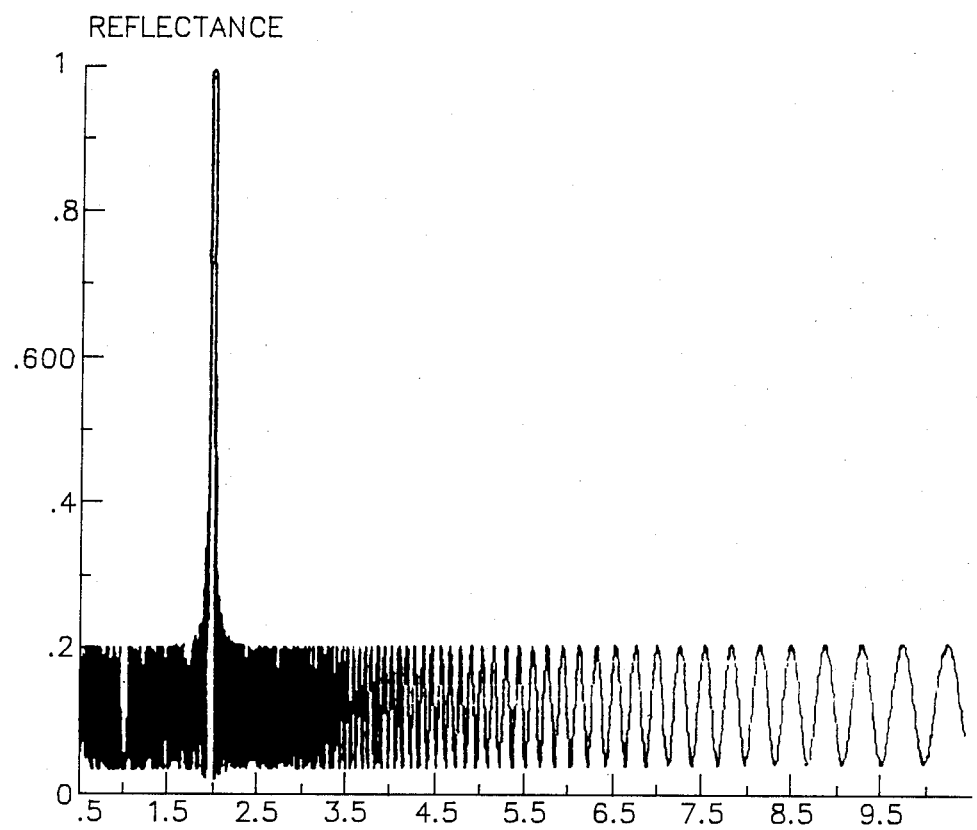
FIG. 2 is a plot of the fraction of light calculated to be reflected by the FIG. 1 filter on the vertical axis as a function of the wavelength of the light, in microns, on the horizontal axis.

The first and most elementary filter design is an unenhanced rugate having 100.5 cycles of sinusoidal variation in its refractive index. FIG. 1 is a plot of the refractive index profile for this filter, with the refractive index of the filter plotted on the vertical axis and the depth or thickness of the filter plotted on the horizontal axis in microns. The FIG. 1 filter is designed to be positioned with the glass substrate adjacent to the left edge of the filter as it is oriented in FIG. 1. This first design is not equipped with any antireflecting structure at its interfaces with the incident medium and substrate. The total thickness of the filter is 50.2 microns, while its optical density within the 2.0 micron rejection band is 3.25. The predicted reflectance of the FIG. 1 filter is illustrated in FIG. 2, which is a plot of the fraction of light calculated to be reflected by the filter on the vertical axis as a function of the wavelength of the light, in microns, on the horizontal axis. Since the variation in refractive index within this rugate filter structure is relatively small, the filter behaves much like a single thick layer having a refractive index equal to the average refractive index 2.0 of the rugate structure. Since there are no index matching layers in this design, the side lobes which can be seen in the reflection pattern of FIG. 2 are high throughout the wavelength regions on either side of the rejection band at 2.0 microns. This fringe structure arises from interference between the light reflected from the front and back surfaces of the filter.

Figure 3:
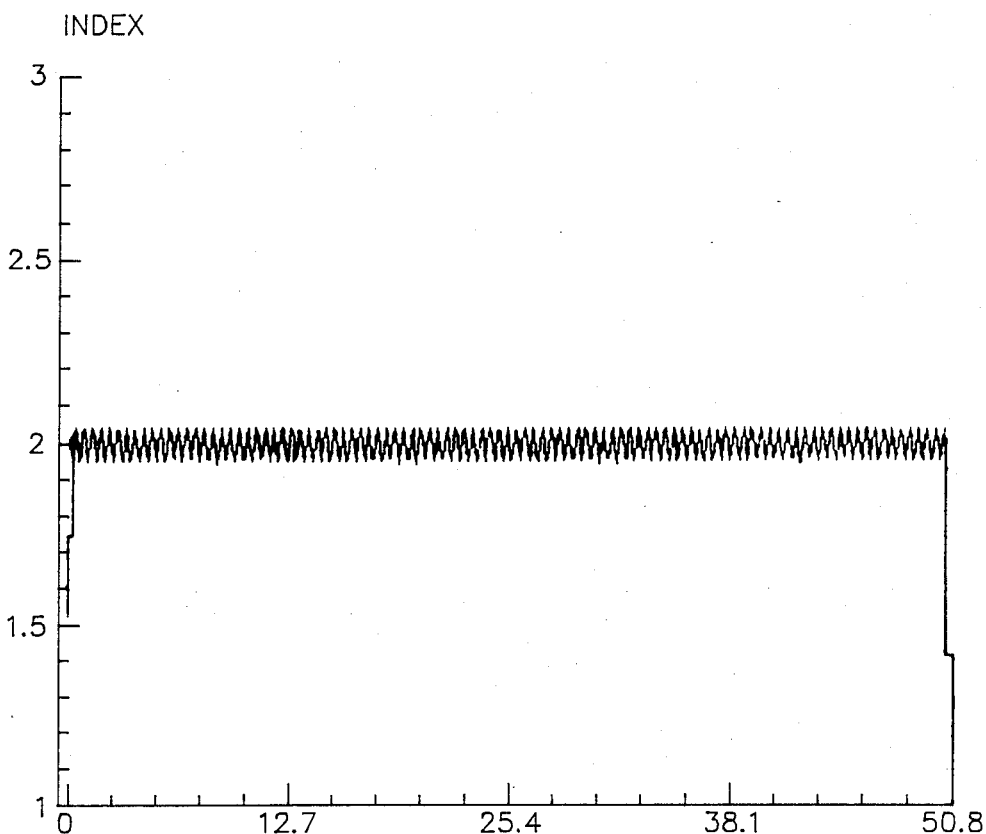
FIG. 3 illustrates the refractive index profile for a filter which includes the addition of quarterwave matching layers at both the incident and substrate sides of the FIG. 1 rugate profile.
Figure 4:
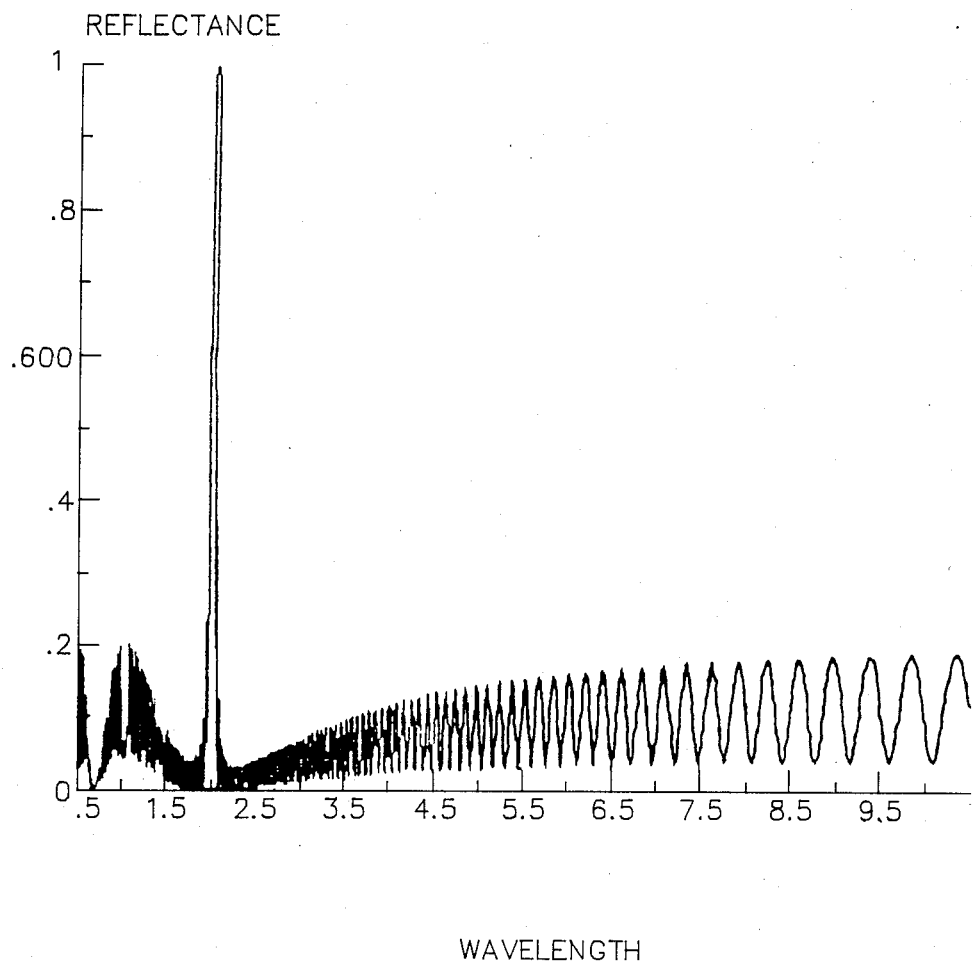
FIG. 4 is a plot of the calculated reflectance for the filter of FIG. 3.

The surface reflectances of the FIG. 1 design may be reduced at any given wavelength by the addition of quarterwave matching layers whose index is specified to be the geometrical mean of the refractive indices of the surrounding media at that wavelength. An antireflecting quarterwave layer with a refractive index $n = (n_a n_s)^{\frac{1}{2}}$, for example, could be placed between the rugate and the substrate, where $n_a$ is the average refractive index of the rugate and $n_s$ is the refractive index of the substrate. FIG. 3 illustrates the refractive index profile for a filter which includes the addition of such quarterwave matching layers at both the incident and substrate sides of the FIG. 1 rugate profile, while FIG. 4 is a plot of the calculated reflectance for the filter of FIG. 3. The cost of using such quarterwave matching layers to suppress the side lobes near the stopband is the reduction of optical density in the stopband from 3.25 to 2.8, while the thickness of the filter increases to 50.8 microns.

Figure 5:
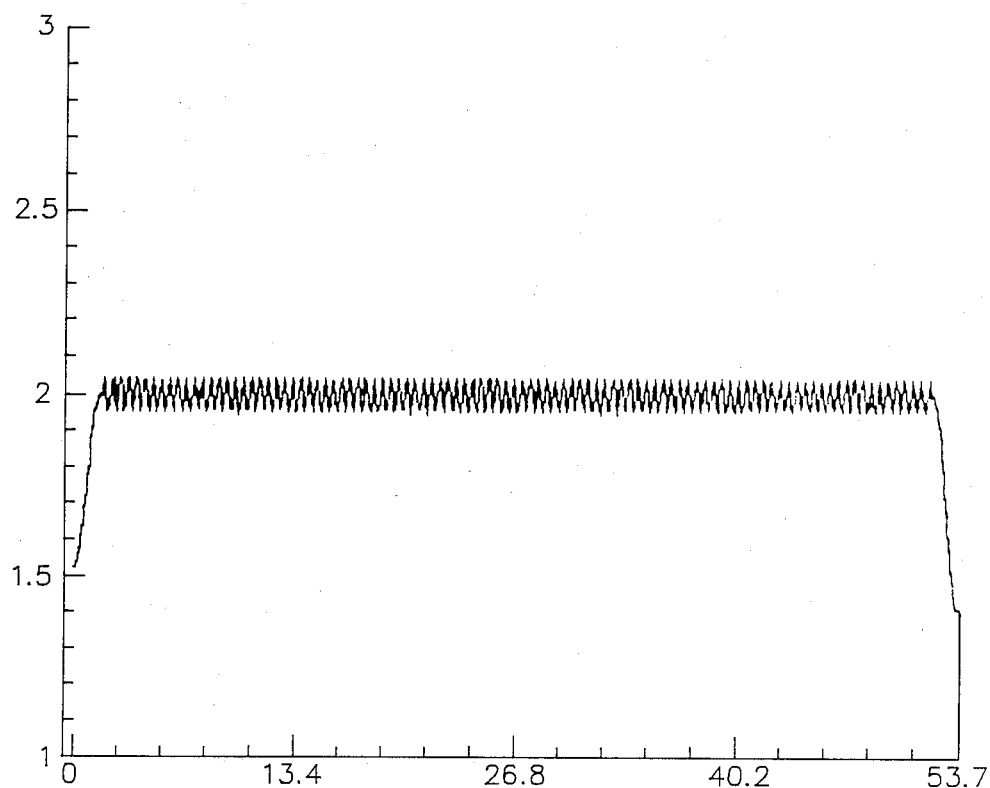
FIG. 5 is a plot of the index profile for a filter which includes the rugate of FIG. 1 and quintic matching layers at each interface.
Figure 6:
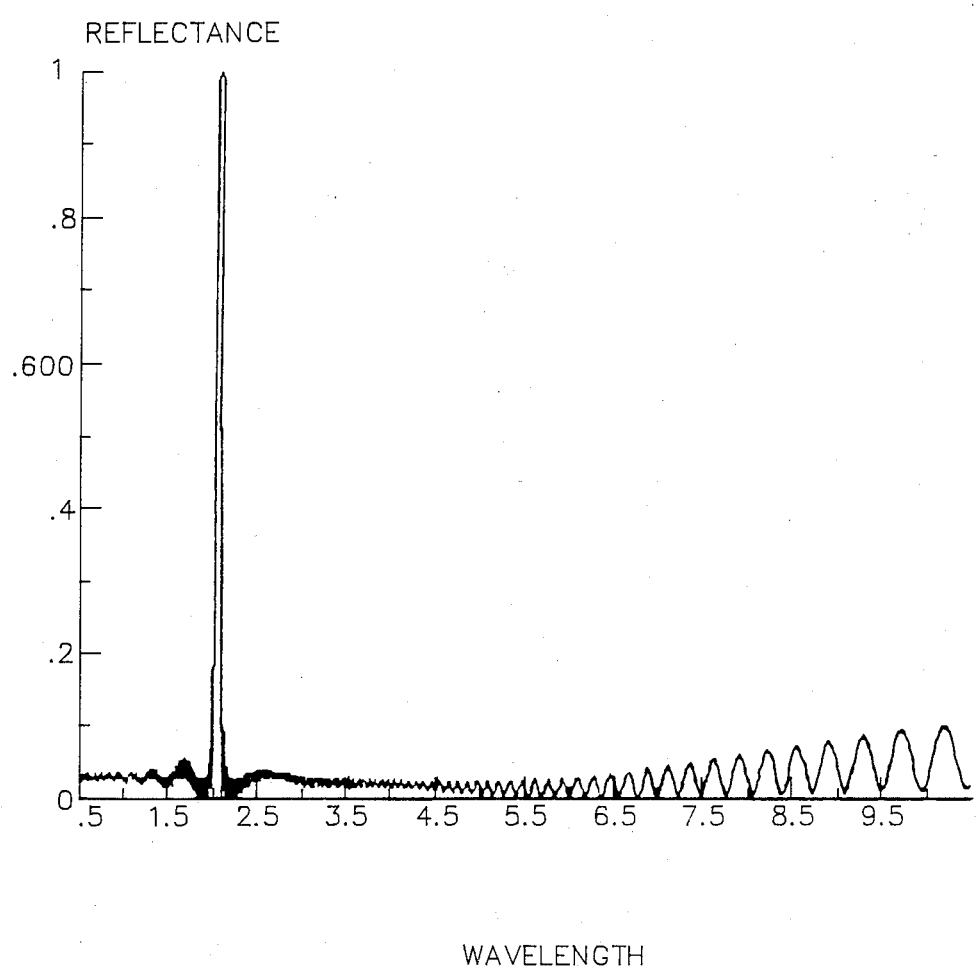
FIG. 6 is a plot of the calculated reflectance for the FIG. 5 filter.

One way to improve the performance of the FIG. 3 design is to incorporate a more sophisticated antireflecting design. Quintic gradient-index layers, for example, have been shown (see Southwell, U.S. Pat. No. 4,583,822) to provide antireflective properties over a broad wavelength region. FIG. 5 is a plot of the index profile for a filter which includes the rugate of FIG. 1 and quintic matching layers at each interface, with the calculated reflectance for this filter plotted in FIG. 6. Each quintic region in this design is three cycles of optical thickness, the optical thickness of each quintic being:

$$O_t = (n_L + n_H/2)T$$

where $n_L$ and $n_H$ are the low and high extremes of the refractive index, while T is the physical thickness of the quintic portion. In the example here, the stopband optical density falls to only 3.0, although the thickness of the filter increase to 53.7 microns. These indicia of the performance of this design show that the addition of the quintics reduces the loss in optical density which is incurred in adding antireflection, while it also effects a much broader suppression of the side bands.

Figure 7:
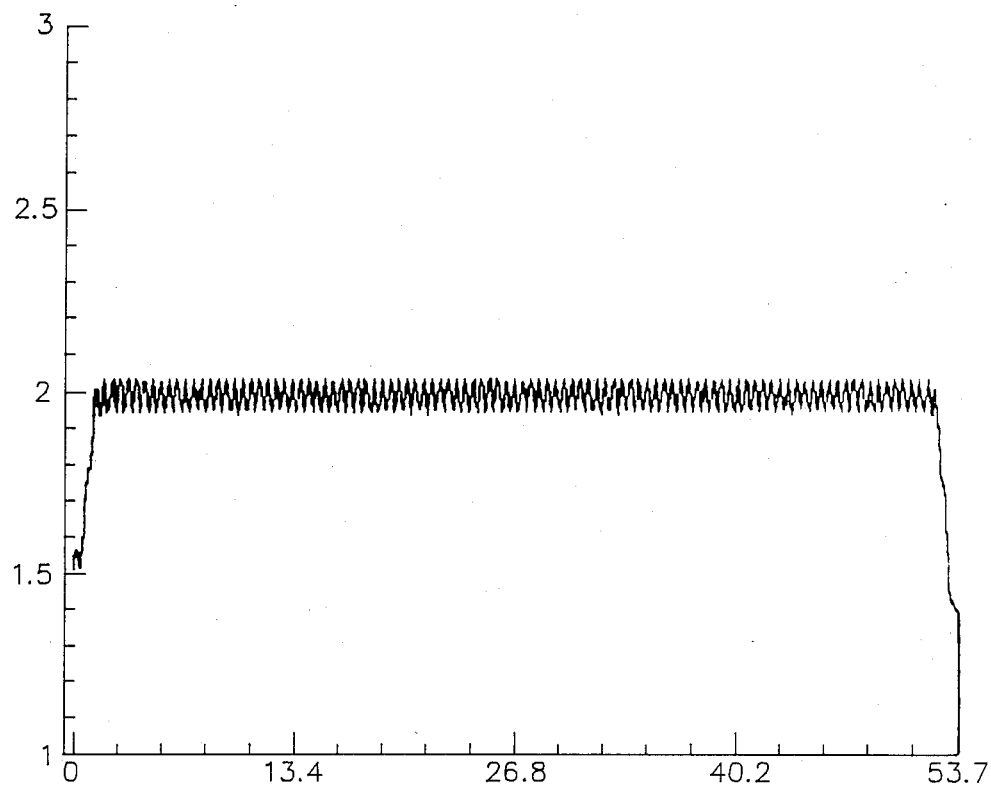
FIG. 7 depicts the refractive index profile for a rugate filter constructed according to this invention with three cycle quintic antireflecting layers with the rugate profile continued into and superimposed on the quintic antireflecting portions of the filter.
Figure 8:
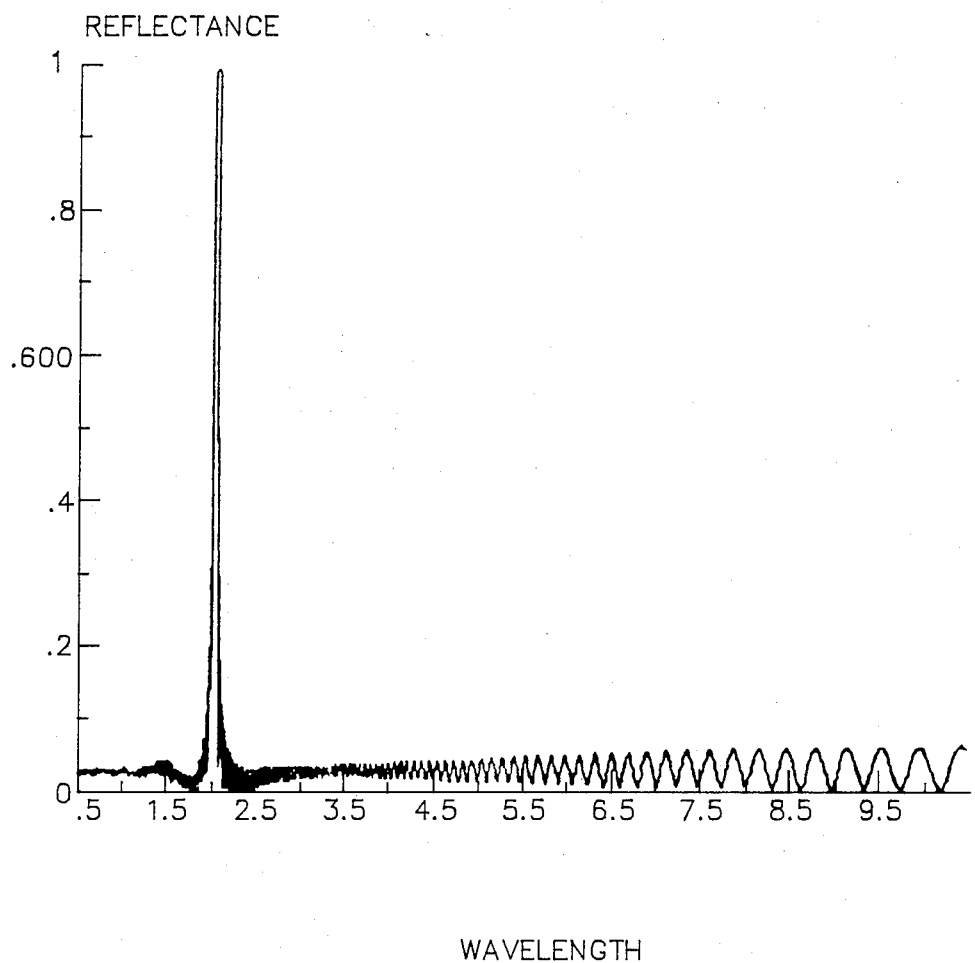
FIG. 8 is a plot of the calculated reflectance for the FIG. 7 filter.

The next refinement in the series of filter designs, the refractive index profile of which is depicted in FIG. 7, is also a rugate with three cycle quintic antireflecting layers. In an outstanding feature of this invention, however, the rugate profile in this embodiment is continued into and superimposed on the quintic antireflecting portions of the filter. The main effect which this change induces in the reflectance profile, which is shown in FIG. 8, is to increase the optical density of the rejection peak from 3.0 to 3.2. This increase in optical density is accomplished with no increase in the thickness of the filter, which remains at 53.7 microns, and with no reduction in the amount of side band suppression.

Figure 9:
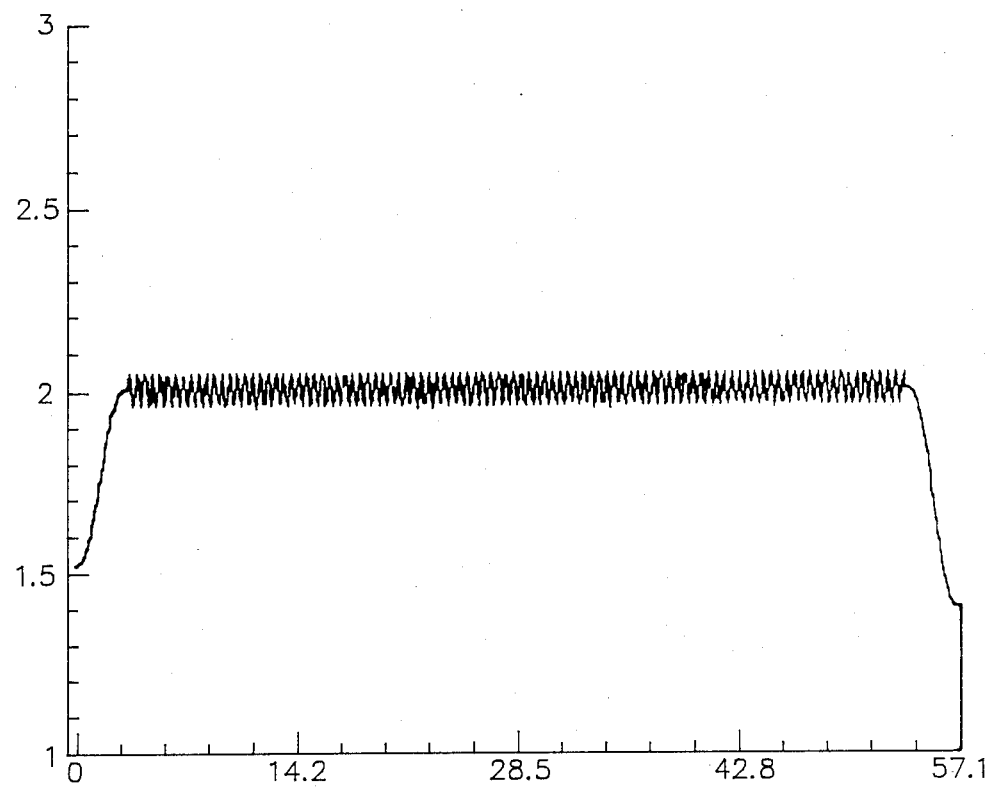
FIG. 9 is a refractive index profile for which includes a rugate center portion with a six cycle quintic added at each end of the rugate.
Figure 10:
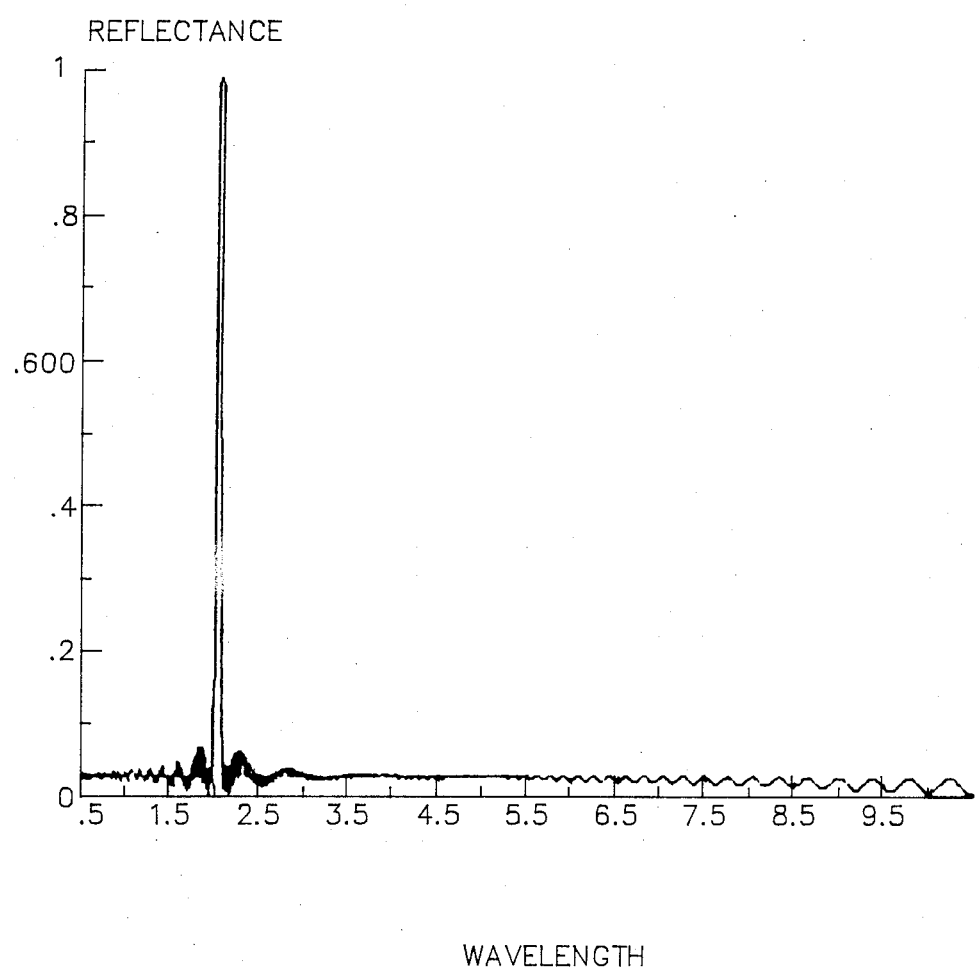
FIG. 10 depicts the calculated reflectance of the FIG. 9 filter.
Figure 11:
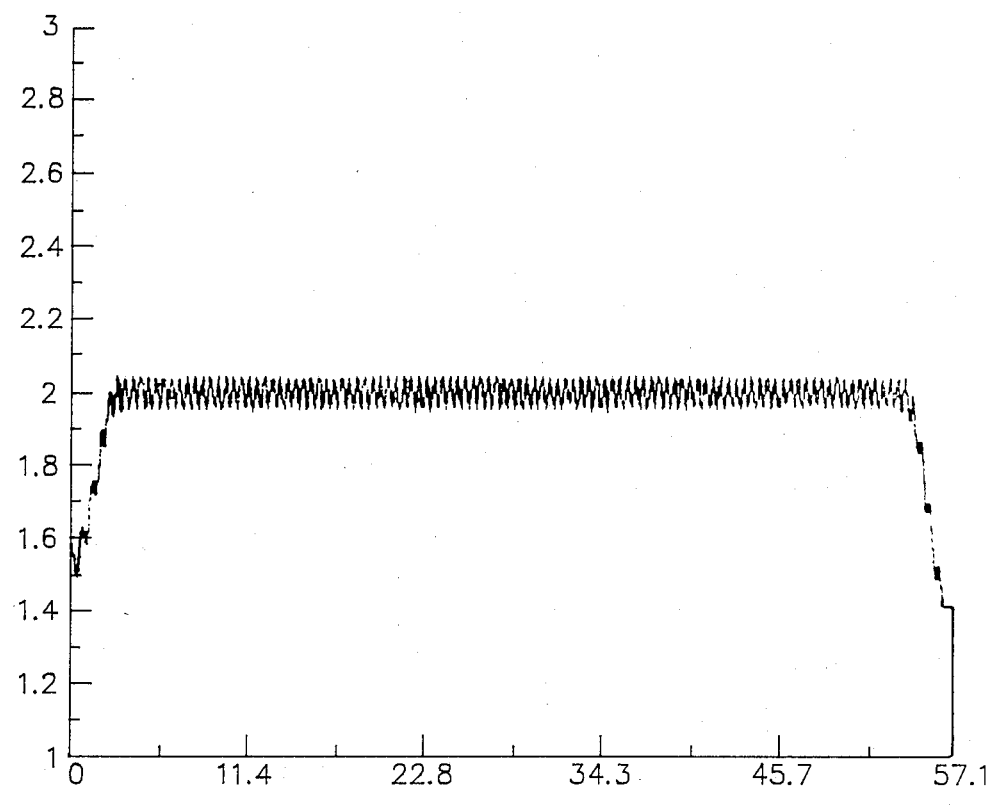
FIG. 11 illustrates the index profile of a filter constructed according to this invention in which the quintic profile is modified by superimposing the rugate cycles.
Figure 12:
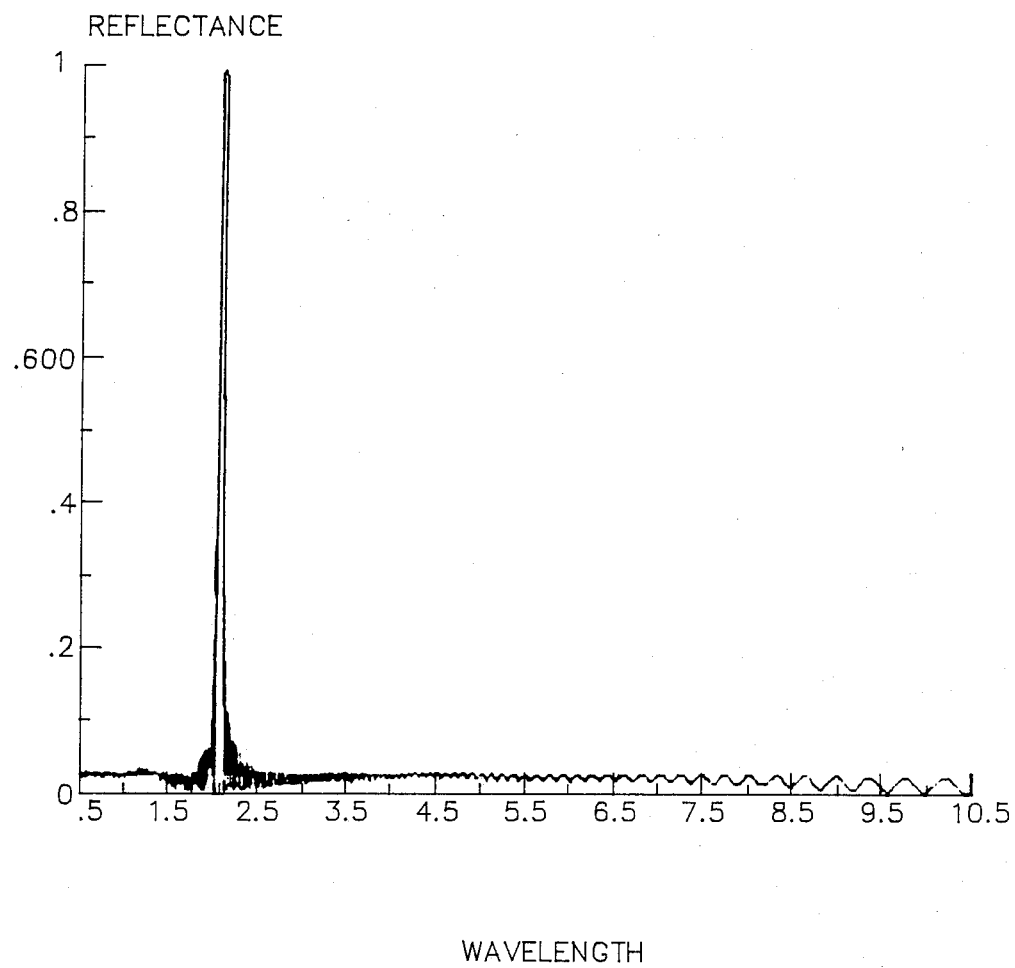
FIG. 12 is a plot of the reflectance of the FIG. 11 filter.

By making the quintic matching regions thicker, as in the filter design whose index profile is plotted in FIG. 9 and whose reflectance is depicted in FIG. 10, the spectrum over which the side lobes are suppressed may be extended. The FIG. 9 design includes a rugate center portion with a six cycle quintic added at each end of the rugate. These additions leave the filter 57.1 microns thick, with a stopband optical density of 3.0. If, in addition, the quintic profile is modified by superimposing the rugate cycles, as in the filter whose index profile is depicted in FIG. 11 and whose reflectance is plotted in FIG. 12, the rejection band optical density for the filter is boosted from 3.0 to 3.4, while the thickness remains at 57.1 microns.

Figure 13:
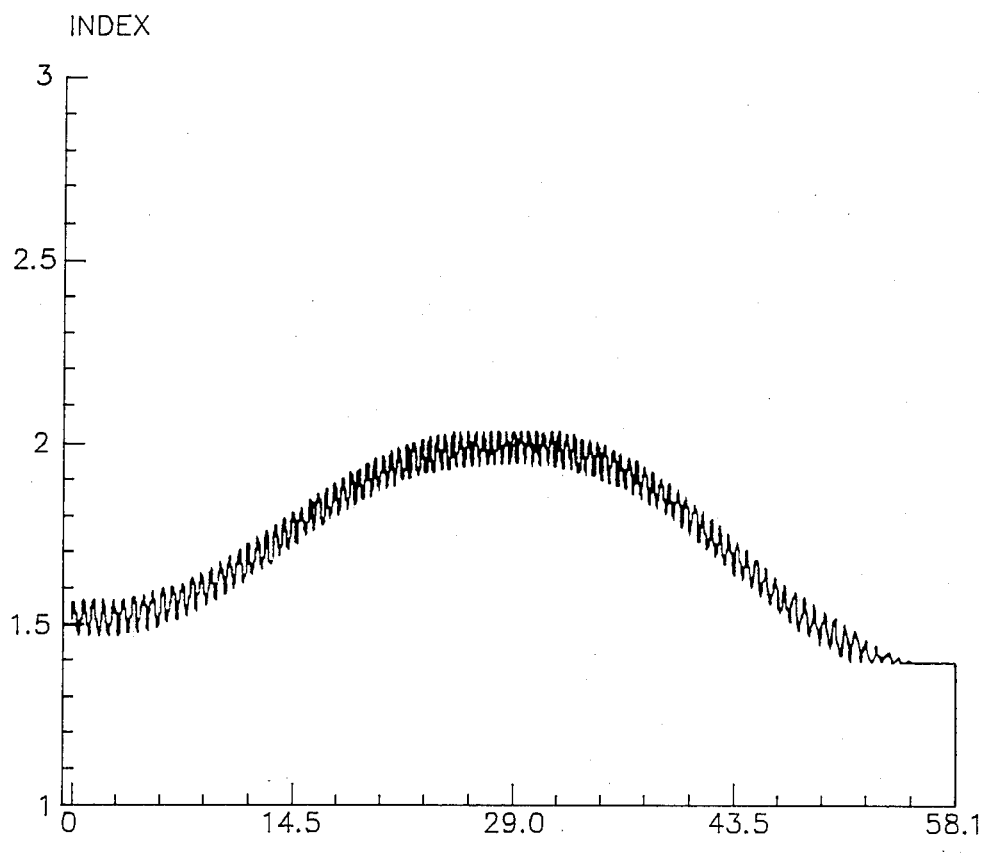
FIG. 13 is a refractive index profile for a filter constructed according to this invention in which two thick back-to-back quintics are made thick enough to superimpose the entire rugate profile on them.
Figure 14:
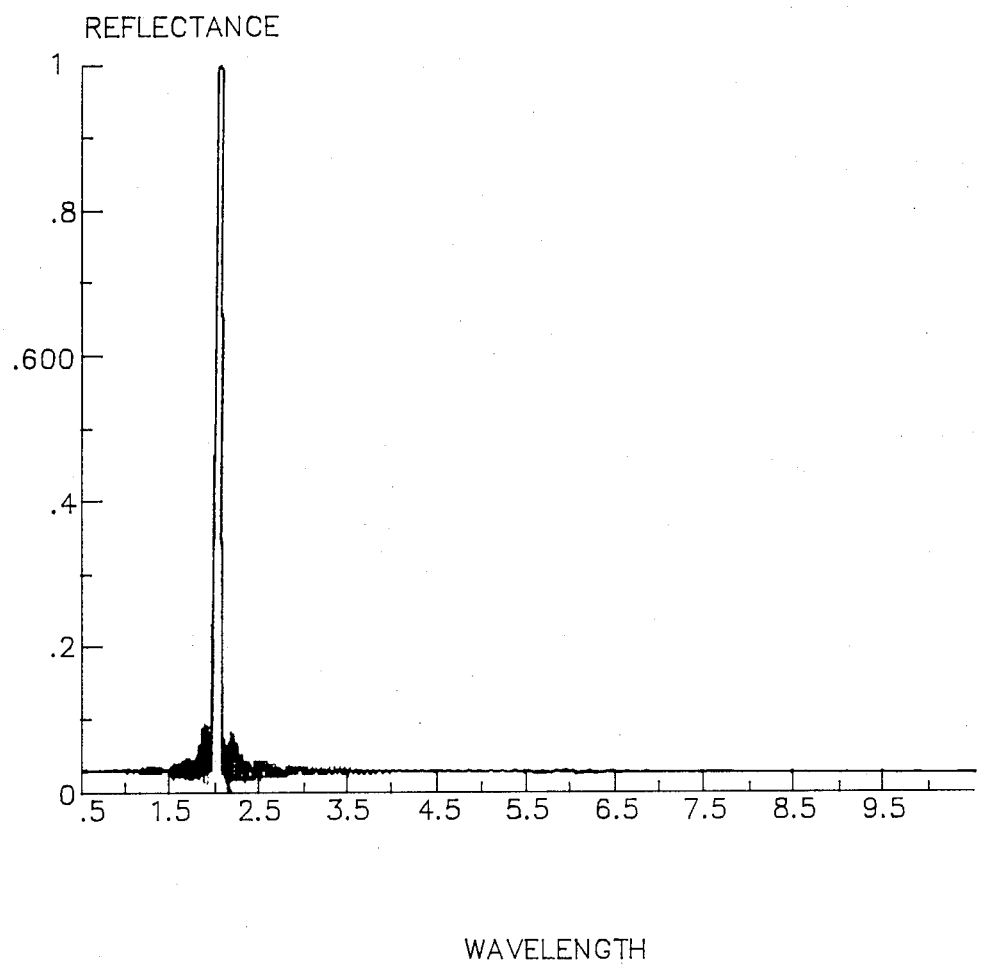
FIG. 14 is the reflectance calculated for the filter of FIG. 13.

The most complete integration of the antireflecting and stopband portions of the filter is achieved in the embodiment whose index profile is depicted in FIG. 13. Here, two thick back-to-back quintics are made thick enough to superimpose the entire rugate profile on them. The improved reflectance of this stucture is illustated in FIG. 14. The optical density is only slightly reduced to 3.1 and there is a slight increase in the thickness of 58.1 microns, while FIG. 14, in comparison to FIG. 12, demonstrates that the broadband side lobe suppression for this completely integrated embodiment is improved over that of the FIG. 11 design. The calculated results for this embodiment thus demonstrates that the average refractive index of the rugate portion of the filter need not remain constant. An additional benefit of this discovery is that it may facilitate the implementation of real-time stress compensation during the deposition of the filter.

This invention provides the fabricator of thin film filters with an additional design option—the integrated periodic-antireflecting filter—when seeking to achieve high peformance in a graded-index filters. The preferred embodiments of this invention have been illustrated and described above. Modifications and additional embodiments, however, will undoubtedly be apparent to those skilled in the art. The person skilled in this art, for example, will appreciate that although the exemplary embodiments are filters with a single stopband, this invention can also be applied to filters with multiple stopbands and to passband filters. In addition, while the embodiments presented here include antireflecting portions for both the incident and substrate sides of the filters, it is within the scope of this invention, and may be desirable in some instances, to provide an antireflecting portion at only a single interface or at an interface within a filter, such as between multiple stopband portions of a filter. Another variation within the scope of this invention involves the extent of overlap between the rejection and antireflection portions of a filter. While in many applications it will be desirable to completely superimpose the rejection profile on the antireflecting portions of a filter, in some instances it may be advantageous to employ a filter with only a partial superposition between the rejection and antireflecting profiles. In this fashion, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

The teaching of the following documents, which are referred to herein, is incorporated by reference:

Southwell, U.S. Pat. No. 4,666,250; Hall, et al., U.S. patent application, Ser. No. 884,689, filed July 11, 1986.

We claim:

1. A gradient index spectral filter for placement between an incident medium and a substrate to reflect incident electromagnetic energy having wavelengths within a predetermined band of wavelengths and to transmit incident electromagnetic energy having wavelengths outside of the reflection band, comprising:
   an antireflecting portion having a nominal refractive index profile selected to reflect a minimum amount of electromagnetic energy; and
   a band rejecting portion having a periodic refractive index profile whose periodicity and amplitude are selected to reflect a maximum amount of electromagnetic energy within the reflection band,
   at least part of the nominal refractive index profile being modulated by the superposition thereon of at least part of the periodic refractive index profile.

2. The filter of claim 1, wherein the entire periodic refractive index profile is superimposed on the nominal refractive index profile.

3. The filter of claim 1, wherein the periodic refractive index profile further comprises a rugate profile.

4. The filter of claim 1, wherein the antireflecting portion further comprises an incident antireflecting portion disposed adjacent to the incident medium, the nominal refractive index profile being selected to reflect a minimum amount of electromagnetic energy from the interface between the incident medium and the filter.

5. The filter of claim 4, further comprising a substrate antireflecting portion disposed adjacent to the substrate and having a substrate nominal refractive index profile selected to reflect a minimum amount of electromagnetic energy from the interface between the filter and the substrate, at least part of the substrate nominal refractice index profile being modulated by the superposition thereon of at least part of the periodic refractive index profile.

6. The filter of claim 5, wherein the entire periodic refractive index profile is superimposed on the incident and substrate nominal refractive index profiles.

7. The filter of claim 1, wherein the antireflecting portion further comprises a substrate antireflecting portion disposed adjacent to the substrate, the nominal refractive index profile being selected to reflect a minimum amount of electromagnetic energy from the interface between the filter and the substrate.

8. The filter of claim 7, further comprising an incident antireflecting portion disposed adjacent to the incident medium and having an incident nominal refractive index profile selected to reflect a minimum amount of electromagnetic energy from the interface between the filter and the incident medium, at least part of the incident nominal refractive index profile being modulated by the superposition thereon of at least part of the periodic refractive index profile.

9. The filter of claim 8, wherein the entire periodic refractive index profile is superimposed on the incident and substrate nominal refractive index profiles.

10. A method of making a gradient index spectral filter for placement between an incident medium and a substrate to reflect incident electromagnetic energy having wavelengths within a predetermined band of wavelengths and to transmit incident electromagnetic energy having wavelengths outside of the reflection band, comprising the steps of:
   selecting a periodicity and amplitude for a periodic refractive index profile which will reflect a maximum amount of electromagnetic energy within the reflection band;
   selecting an antireflecting portion with a nominal refractive index profile which will reflect a minimum amount of electromagnetic energy; and
   fabricating the filter such that at least part of the periodic refractive index profile is superimposed on at least part of the nominal refractive index profile.

11. The method of claim 10, wherein the step of selecting a periodicity and amplitude further comprises:
   selecting a sinewave periodicity and amplitude for a rugate refractive index profile.

12. The method of claim 10, wherein the step of superimposing further comprises superimposing the entire periodic refractive index profile on at least part of the nominal refractive index profile.

13. The method of claim 10, wherein the step of selecting an antireflecting portion further comprises:

selecting an incident antireflecting portion with an incident nominal refractive index profile which will reflect a minimum amount of electromagnetic energy from the interface between the incident medium and the filter;

further comprising the step of:

selecting a substrate antireflecting portion with a substrate nominal refractive index profile which will reflect a minimum amount of electromagnetic energy from the interface between the substrate and the filter;

and wherein the step of superimposing further comprises:

superimposing at least part of the periodic refractive index profile on at least part of the incident and substrate nominal refractive index profiles.

14. The method of claim 13, wherein the step of superimposing further comprises superimposing the entire periodic refractive index profile on at least part of the incident and substrate nominal refractive index profiles.

15. The method of claim 10, wherein the step of selecting an antireflecting portion further comprises:

selecting a substrate antireflecting portion with a substrate nominal refractive index profile which will reflect a minimum amount of electromagnetic energy from the interface between the substrate and the filter;

further comprising the step of:

selecting an incident antireflecting portion with an incident nominal refractive index profile which will reflect a minimum amount of electromagnetic energy from the interface between the incident medium and the filter;

and wherein the step of superimposing further comprises:

superimposing at least part of the periodic refractive index profile on at least part of the incident and substrate nominal refractive index profiles.

16. The method of claim 15, wherein the step of superimposing further comprises superimposing the entire periodic refractive index profile on at least part of the incident and substrate nominal refractive index profiles.

17. A gradient index spectral filter for placement between an incident medium and a substrate to reflect incident electromagnetic energy having wavelengths within a predetermined band of wavelengths and to transmit incident electromagnetic energy having wavelengths outside of the reflection band, comprising:

an incident antireflecting portion disposed adjacent to the incident medium and having a nominal refractive index profile selected to reflect a minimum amount of electromagnetic energy from the interface between the incident medium and the filter; and a substrate antireflecting portion disposed between the substrate and the incident portion and having a nominal refractive index profile selected to reflect a minimum amount of electromagnetic energy from the interface between the filter and the substrate, the nominal incident and substrate refractive index profiles being modulated by a superimposed periodic refractive index profile whose periodicity and amplitude are selected to reflect a maximum amount of electromagnetic energy within the reflection band.

18. The filter of claim 17, wherein the periodic refractive index profile further comprises a rugate profile.

19. The filter of claim 17, wherein the nominal incident and substrate refractive index profiles further comprise quintic refractive index profiles.

20. A method of making a gradient index spectral filter for placement between an incident medium and a substrate to reflect incident electromagnetic energy having wavelengths within a predetermined band of wavelengths and to transmit incident electromagnetic energy having wavelengths outside of the reflection band, comprising the steps of:

selecting a periodicity and amplitude for a periodic refractive index profile which will reflect a maximum amount of electromagnetic energy within the reflection band;

selecting an incident antireflecting portion with a refractive index profile which will reflect a minimum amount of electromagnetic energy from the interface between the incident medium and the filter;

selecting a substrate antireflecting portion with a refractive index profile which will reflect a minimum amount of electromagnetic energy from the interface between the filter and the substrate;

combining the incident profile and the substrate profile; and fabricating the filter such that the periodic profile is superimposed on the combined profile.

21. The method of claim 20, wherein the step of selecting a periodicity and amplitude further comprises:

selecting a sinewave periodicity and amplitude for a rugate refractive index profile.

22. The method of claim 20, wherein the step of selecting an incident antireflecting portion further comprises:

selecting an incident antireflecting portion with a quintic refractive index profile;

and wherein the step of selecting a substrate antireflecting portion further comprises;

selecting a substrate antireflecting portion with a quintic refractive index profile.

* * * * *